T. P. JONES.
JACK.
APPLICATION FILED MAY 15, 1913.
1,113,015.
Patented Oct. 6, 1914.
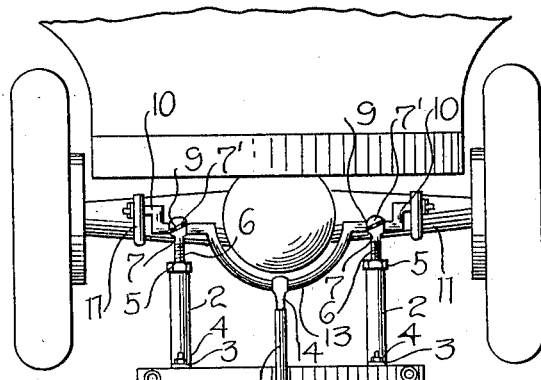
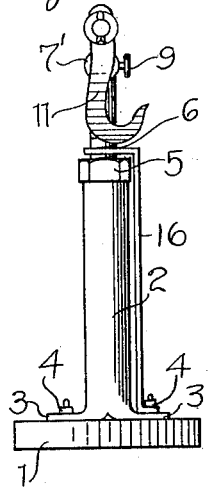
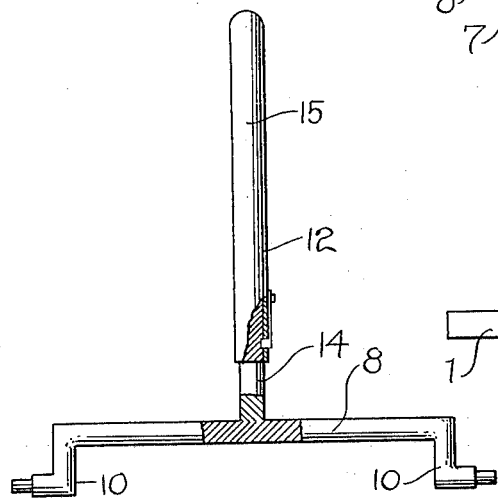
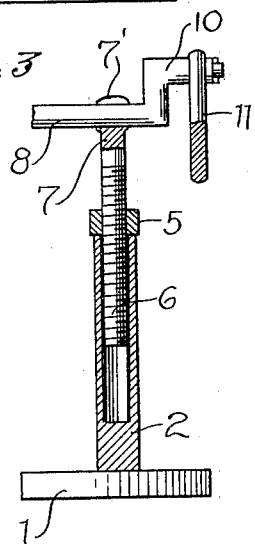
Inventor
THOMAS P. JONES.
Witnesses
Robert M. Sutphen
A. L. Hind
By Watson E. Coleman
Attorney
THE NORRIS PETERS CO., PHOTO-LITHO., WASHINGTON, D. C.

UNITED STATES PATENT OFFICE.

THOMAS P. JONES, OF WATKINS, MINNESOTA.

JACK.

1,113,015.   Specification of Letters Patent.   Patented Oct. 6, 1914.

Application filed May 15, 1913. Serial No. 767,818.

*To all whom it may concern:*

Be it known that I, THOMAS P. JONES, a citizen of the United States, residing at Watkins, in the county of Meeker and State of Minnesota, have invented certain new and useful Improvements in Jacks, of which the following is a specification, reference being had to the accompanying drawings.

This invention relates to new and useful improvements in jacks and more particularly to an automobile jack, the object of the invention being to provide an automobile jack wherein an automobile may be quickly and readily raised so that the tires of the machine will be suspended above the floor to relieve the same of the weight of the body of the machine and also permitting the wheels to each revolve separately so that the tire casing or the whole tire may be quickly and readily removed and replaced by a new one.

Another object of the invention is to provide an automobile jack of the above character which will possess advantages in points of efficiency and durability, is inexpensive of manufacture and at the same time is simple in construction and operation.

With the above and other objects in view, this invention consists in the novel features of construction and the combination and arrangements of parts to be hereinafter more fully described, pointed out in the claims and shown in the accompanying drawings, in which—

Figure 1 is a top plan view of an automobile jack constructed in accordance with my invention, parts being broken away and in section; Fig. 2 is an elevation illustrating a modified form of the invention; Fig. 3 is a vertical sectional view taken through the standards and adjustable shanks; and Fig. 4 is an end elevation.

Referring more particularly to the drawings, 1 indicates the base which may, if desired, be substantially rectangular in shape as shown at 13, as illustrated in the accompanying drawings. Mounted upon the base adjacent each end thereof are the standards 2, the lower ends of which are provided with the outwardly projecting flanges 3, which are secured to the base member 1 by means of the screws 4 or other suitable fastening means. The standards 2 are preferably hollow and mounted upon the upper end thereof is an internally threaded nut 5, which is adapted to be engaged by the threaded shank 6 of the hoisting members 7. Formed upon the upper end of the shank 6 is an open sided sleeve 7'. Rotatably mounted within the sleeves 7' is a longitudinal shaft 8, said shaft being held against rotation when disposed in a desired position, by means of the set screws 9 which are carried by the sleeves 7' and adapted to engage the ends of the shaft.

The outer ends of the shaft 8 are provided with the crank arms 10 upon which are mounted the supporting hooks 11, said hooks being adapted to engage beneath the axle of the machine to raise the same, when desired. Secured to the shaft 8 in any suitable manner or formed integral therewith is the operating lever 12, which is adapted to be actuated to raise and lower the vehicle axle. It will be apparent that when the jack is in an inoperative position, the crank arms 10 will be disposed at their lowest point so that upon the rotation of the shaft 8, the crank arms will be rotated to raise and lower the vehicle axle through the medium of the hooks 11.

In Fig. 2, I have shown a slightly modified form of the shaft wherein the intermediate portion of the same is substantially arcuate in shape and formed integral with the central portion of the shaft is a shank 14 upon which is adapted to be secured a hand lever 15 whereby the shaft may be quickly and readily manipulated, when desired. It will be apparent that this form of shaft, as shown and illustrated, is especially adapted for use upon the rear axle of a machine wherein the arcuate portion 13 will readily allow the same to pass the differentials upon the rear axle. It will also be apparent that when the axle is in its raised position, the shaft 8 will be held in its operative position by means of the set screws 9 which are mounted within the sleeves 7' and adapted for quick and ready adjustment to engage the shaft 8. Brace members 16 are provided, the upper ends of which encircle the shanks, the body portions of said brace members being arranged in parallel relation with the standards 2 and the lower ends thereof bolted to the base member 1.

From the above description taken in connection with the accompanying drawings it will be readily apparent that I have provided a simple and durable jack in which the automobile may be quickly and readily raised so as to release the strain of the tires from resting upon the floor and also to provide means whereby the tire casing may be quickly and readily removed from the rim, when desired. It will also be apparent that the device may be quickly and readily actuated and will hold the vehicle axle in a raised position until released.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the character described comprising vertically disposed standards, shanks adjustably engaged with the standards and having their upper extremities provided with sleeves, the bores of which being horizontally disposed, a shaft rotatably mounted within the sleeves and projecting beyond the shanks, such projected extremities of the shaft being formed into crank arms, hook members carried by the crank arms, means for imparting rotation to the shaft, and means adjustable through the sleeves of the shanks engageable with the shaft for holding such shaft against rotation.

2. A device of the character described comprising vertically disposed standards, shanks adjustably engaged with the standards and having their upper extremities provided with sleeves, the bores of which being horizontally disposed, a shaft rotatably mounted within the sleeves and projecting beyond the shanks, such projected extremities of the shaft being formed into crank arms, hook members carried by the crank arms, means for imparting rotation to the shaft, means adjustable through the sleeves of the shanks engageable with the shaft for holding such shaft against rotation, and brace members coacting with the shanks and the base and being disposed on that side of the standard toward which the free extremities of the hook members project.

In testimony whereof I hereunto affix my signature in the presence of two witnesses.

THOMAS P. JONES.

Witnesses:
T. F. DILLON,
E. ENDERLE.

---

Copies of this patent may be obtained for five cents each, by addressing the "Commissioner of Patents, Washington, D. C."